April 28, 1942.   W. V. SMITH   2,281,055
MOWER SHARPENER
Filed April 2, 1940   3 Sheets-Sheet 1
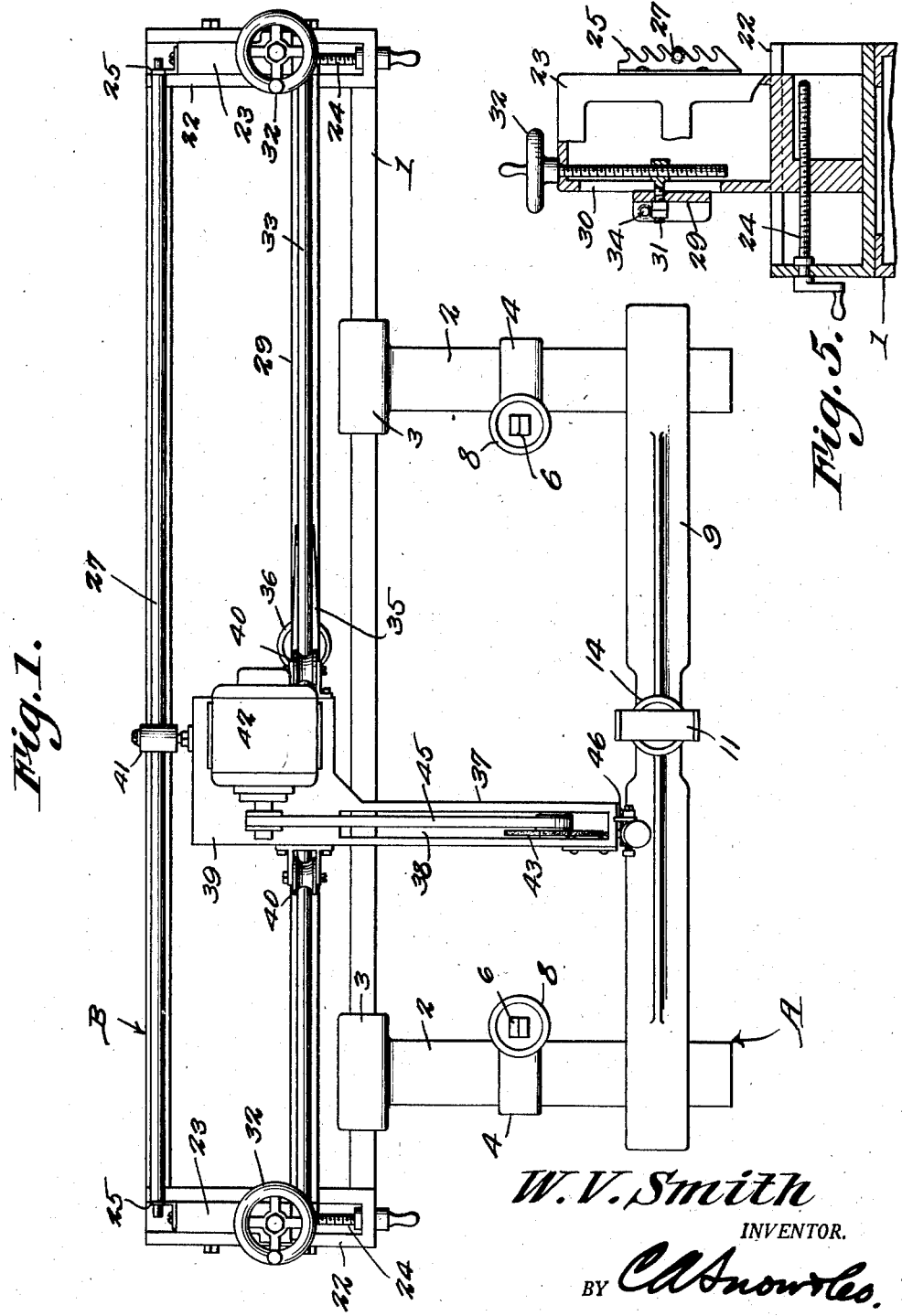
W. V. Smith
INVENTOR.
BY CA Knowles
ATTORNEYS.

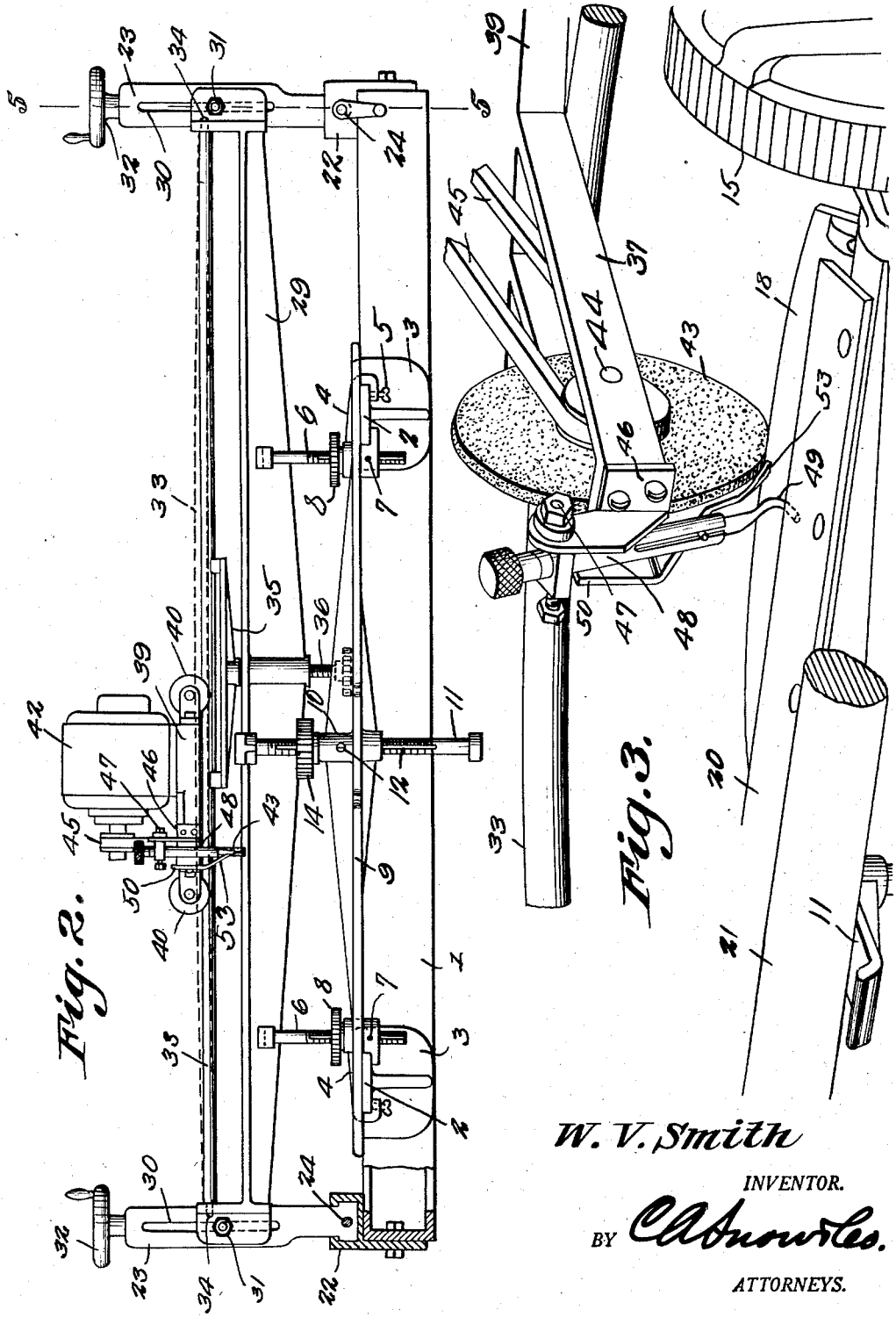

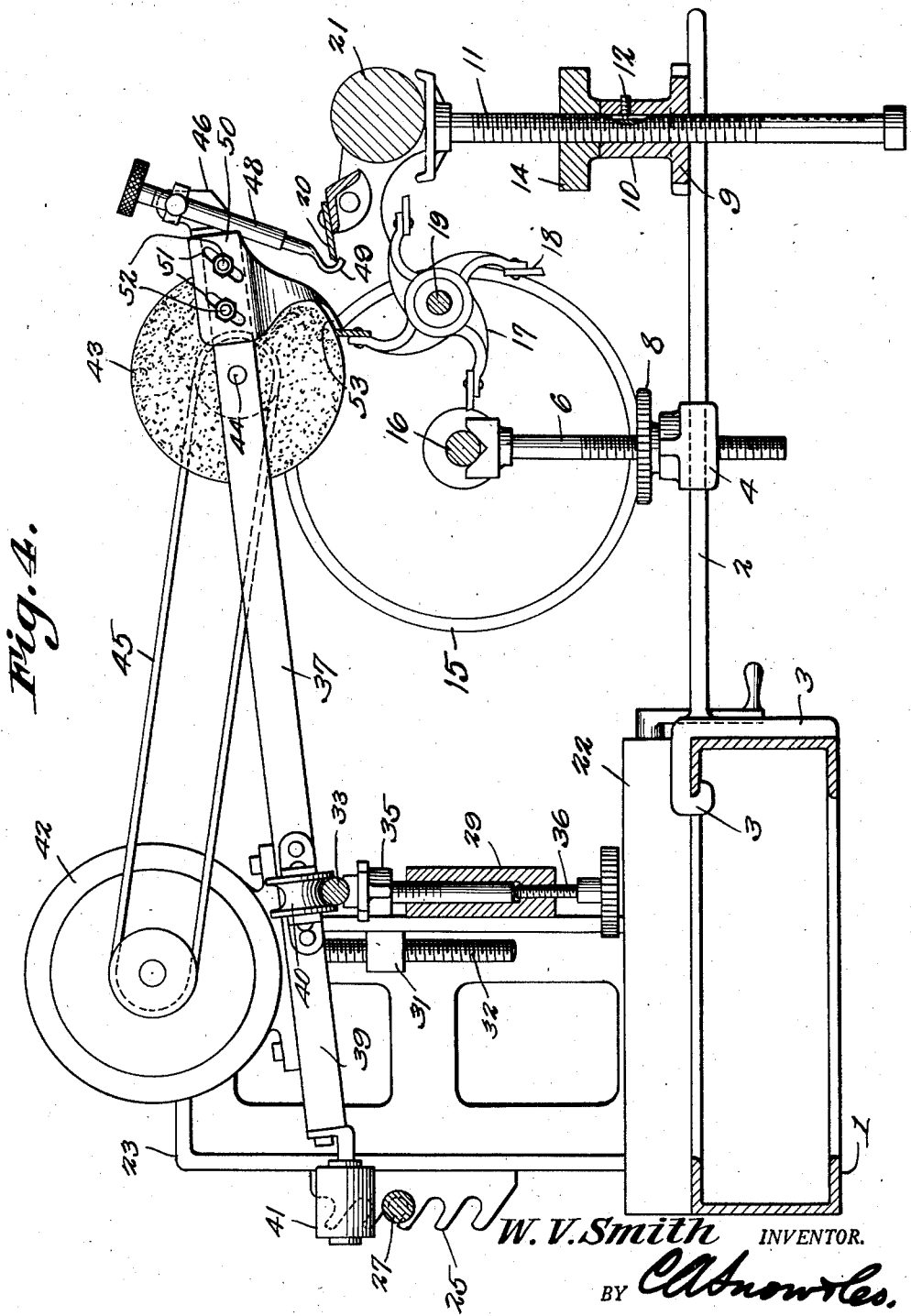

Patented Apr. 28, 1942

2,281,055

UNITED STATES PATENT OFFICE 2,281,055

MOWER SHARPENER

William V. Smith, Greenville, Ill.

Application April 2, 1940, Serial No. 327,501

2 Claims. (Cl. 51—48)

This invention aims to provide novel means for supporting a sharpening element for movement longitudinally of the rotary cutter of a lawn mower in a path convexed with respect to the length of the cutter, the result being that the blades of the cutter will be ground convexly with respect to the fixed shear of the mower; novel means being provided for altering the convexity of the cutting edge of each mower blade at the will of an operator; it being possible to vary the cutting bevel of the blade; novel means being supplied for mounting a lawn mower relatively to the sharpener; novel means being embodied for adjusting the sharpener relatively to the mower, and novel means being provided whereby the rotary grinding or sharpening element of the sharpener may be driven.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows, in top plan, a lawn mower grinding machine constructed in accordance with the invention;

Fig. 2 is a front elevation wherein parts have been sectioned away;

Fig. 3 is a perspective disclosing the grinding instrumentality and associated parts in operative relation to a lawn mower;

Fig. 4 is a transverse section wherein many parts appear in elevation;

Fig. 5 is a section on the line 5—5 of Fig. 2.

For convenience in selecting terms describing the relative positions of parts, that portion of the machine which is marked by the letter A in Fig. 1 will be considered the front, the rear of the machine being marked by the letter B.

The machine comprises a body or frame, including a base 1, in the form of a horizontal rectangular member, which, if desired, may be supported on legs, without the exercise of invention and without demanding justifying illustration. A mount for the rotary cutter of a lawn mower is provided, and includes straight parallel brackets 2 extending forwardly from the base 1, and the brackets are provided at their rear ends with hook-shaped foot pieces 3, detachably engaged with the front bar of the base 1, for sliding adjustment longitudinally thereof, at the will of an operator, the foot pieces holding the brackets 2 in horizontal position.

Slides 4 are mounted on the brackets 2, for adjustment longitudinally thereof, and are held in place by set screws 5, shown in Fig. 2. Supports 6 are provided, and preferably are screws, mounted on the slides 4, inwardly of the brackets 2, for vertical adjustment. Adjusting wheels 8 are threaded on the screws 6 and, bearing on the slides 4, afford a means whereby the supports 6 can be raised and lowered. The screws 6 are notched at their upper ends, to form seats for the axle 16 of the rotary cutter of a lawn mower, to be alluded to hereinafter.

A movable cross bar 9 rests at its ends on the brackets 2, and between its ends, as shown in Fig. 4, the cross bar has an upstanding tubular guide 10. A support 11, preferably a screw, has vertical adjustment in the guide 10, the support being held as indicated at 12 in Fig. 4, against rotation. An adjusting wheel 14 is threaded on the support 11, and, bearing on the guide 10, affords a means whereby the support 11 can be raised and lowered at the will of an operator, after the holding means 12 has been released.

Referring to Figs. 4 and 3, the ground wheels 15 of a lawn mower are carried by the lawn mower axle 16. The rotary cutter of the lawn mower is shown at 17 and has spiral blades 18, the shaft of the cutter appearing at 19. A fixed shear 20 forms part of the mower and cooperates with the cutter 17 when the mower is in use. A roller is shown at 21. The parts designated by the numerals 15 to 21 comprise no more than an ordinary lawn mower construction. The lawn mower axle 16 is carried by the supports 6, and the roller 21 rests on the support 11, and thus the mower is upheld for grinding, as shown in Fig. 4.

Horizontal guides 22 (Figs. 1, 4 and 5) are secured to the ends of the base 1. The lower ends of vertical standards 23 are mounted in the guides 22, slidably, for adjustment forwardly and backwardly. The forward and backward movement of the standards 23 is brought about by adjusting screws 24, under the control of an operator, the screws being held against rotation in the guides 22, and being threaded into the lower parts of the standards 23, as Fig. 5 will show.

Vertical racks 25 (Figs. 5 and 4) are secured to the rear edges of the standards 23. The steps of the racks 25 receive the reduced ends of a supporting bar 27 (Fig. 1), the function of which will be made manifest hereinafter. The construction is such that the stop bar 27 can be adjusted vertically, but it will not shift endwise, because of the shoulders formed by the reduced ends of the stop bar.

An elongated cross bar or carrier 29 (Fig. 2) is located immediately in front of the standards 23. The standards 23 have vertical slots 30, receiving clamping elements 31 which attach the cross bar to the standards, for vertical adjustment. The vertical adjustment of the cross bar 29 is brought about by hand screws 32 (Fig. 1), mounted in the upper ends of the standards 23, but having no vertical movement therein, the screws being threaded into the heads of the clamping elements 31 that attach the bar 29 to the standards 23.

The numeral 33 marks a resilient track which extends transversely of the machine, the resiliency of the track enabling it to be bowed upwardly, from the solid line position of Fig. 2 to the dotted line position of that figure, for example, or, for example, to the solid line position of Fig. 3. The track 33 has reduced ends 34 received in offsets on the cross bar 29.

A means is provided for bowing up the track 33 from the solid line position of Fig. 2 to the dotted line position of that figure at the will of an operator. The means to that end embodies a T-shaped lifter 35 (Fig. 2), the horizontal head of which engages under the track 33. The depending shank of the lifter 35 is graduated longitudinally and has vertical adjustment in the intermediate portion of the cross bar 29, as Fig. 4 will show. An adjusting screw 36 is threaded into the lower part of the cross bar 29 and bears against the shank of the lifter 35, the cross bar affording a point of reference for the graduations on the shank of the lifter 35.

The numeral 37 designates a forwardly-presented lever, arranged at right angles to the track 33, the lever having a slot 38 (Fig. 1). At its rear end, the lever 37 is supplied with a broadened table 39. Grooved wheels 40 are journaled on the sides of table 39 and ride on the track 33, to keep the lever 37 at right angles to the track. The construction is such that the table 39 and the lever 37 can move lengthwise of the track 33, and by means of the wheels 40, the lever 37, including the table 39, is fulcrumed intermediate its ends on the track for vertical swinging movement.

A roller 41 is mounted to turn on the rear end of the table 39 and, cooperating with the stop bar 27, limits the upward movement of the forward end of the lever, when the lever is raised by an operator. A prime mover, for example an electric motor 42, is secured to the table 39. A grinding wheel 43 is disposed in the slot 38 of the lever 37 and is carried by a shaft 44 (Fig. 4) mounted to turn in the lever. The shaft 44 of the grinding wheel 43 is rotated from the motor 42 by a belt and pulley drive 45.

An angle bracket 46 is secured to the forward end of the lever 37, as can be seen best in Fig. 3. Disposed alongside the angle bracket 46 and attached thereto at 47 in an anchor 48, known functionally in the art and including a depending, yieldably mounted hook 49, adapted to engage under the shear 20 of the lawn mower, as shown in Fig. 4.

A guide plate 50 is disposed alongside the lever 37, a little to the rear of the anchor 48, the plate having downwardly and backwardly inclined slots 51, receiving clamping stud bolts 52 carried by the lever 37. The plate 50 has a downwardly inclined and rearwardly extending toe 53 which bears against the forward surface of the mower blade 18 that is being sharpened, closely adjacent to the periphery of the grinding wheel 43.

The mower is leveled by means of the screws 6 and 11. The mower may not be perfectly symmetrical so far as its opposite sides are concerned, and for that reason, the two screws 6 are provided.

As to gross operation, the table 39 and the lever 37 and associated parts are reciprocated by hand on the track 33. The grinding wheel 43 is rotated from the motor 42 by the belt and pulley drive 45.

An adjustable and upward bow can be put into the track 33 by means of a flexing mechanism including the lifter 35 and the screw 36. As a consequence of this bowing of the track 33, the table 39 and the lever 37 do not move in a straight line, transversely of the machine, but ride, at the will of an operator, in a curved path convexed with respect to the length of the lawn mower cutter 17. The grinding wheel 43 participates in this movement, and the edge of the mower blade 18 is not ground in a straight line, but in consonance with the bow or arc of the track 33. As a consequence, a properly sharpened mower blade 18 presents a convexed edge to the straight edge of the mower shear 20. It has been found that such a relative relation between the mower blade and the shear 20 causes the mower to cut better than would be the case otherwise, especially in long grass.

The mower blade 18 rests against the toe 53 of the plate 50 (Fig. 4), and an even bevel on the mower blade is produced, from one end of the blade to the other. If it is desired to adjust the bevel on the blade 18, the bolts 52 on the lever 37 are slacked away and the plate 50 can be so shifted that the toe 53 of the plate will be adjusted circumferentially of the grinding wheel 43. In this way, the place where the mower blade 18 engages the periphery of the grinding wheel 43 can be varied, circumferentially of the grinding wheel, and the bevel on the blade will be altered accordingly.

The adjustment afforded by the supports 6 and the hand wheels 8 adapts the device to lawn mowers the ground wheels 15 whereof are of different diameters. Thereafter a vertical adjustment in the position of the lever 37 and associated parts, in the machine itself, may be effected by raising or lowering the cross bar or carrier 29, through the instrumentality of the hand screws 32 of Fig. 5. If the track 33 is left straight, the grinding takes place on a straight line rather than on a curve. The cutting edge of the shear 20 is ground to a straight line before the track 33 is arched for the grinding of the spiral blades 18 of the rotary cutter 17.

What is claimed is:

1. In a lawn mower sharpener, a frame, a carrier, means for mounting the carrier on the frame for raising and lowering, a track on the carrier, means under the control of an operator and cooperating with the carrier and the track to bow the track adjustably, a lever, means for mounting the lever on the track for vertical tilting movement transversely of the track and for movement lengthwise of the track, a sharpening element carried by the lever, a guide carried by the lever and movable with the lever along a lawn mower blade to be ground, and means for holding the lever in such position that the sharpening element will cooperate with the blade to be sharpened.

2. A lawn mower sharpener constructed as set forth in claim 1, in combination with a stop and means for mounting the stop on the frame for vertical adjustment at the will of an operator, the lever coming into engagement with the stop when the lever swings upwardly to dispose the sharpening element in inoperative position.

WILLIAM V. SMITH.